May 8, 1962 E. D. BLUM ET AL 3,033,649
PROCESS FOR RECOVERING ALKALINE EARTH METAL SULFATES
IN MANUFACTURING ALKALINE EARTH METAL SULFONATES
Filed June 4, 1959
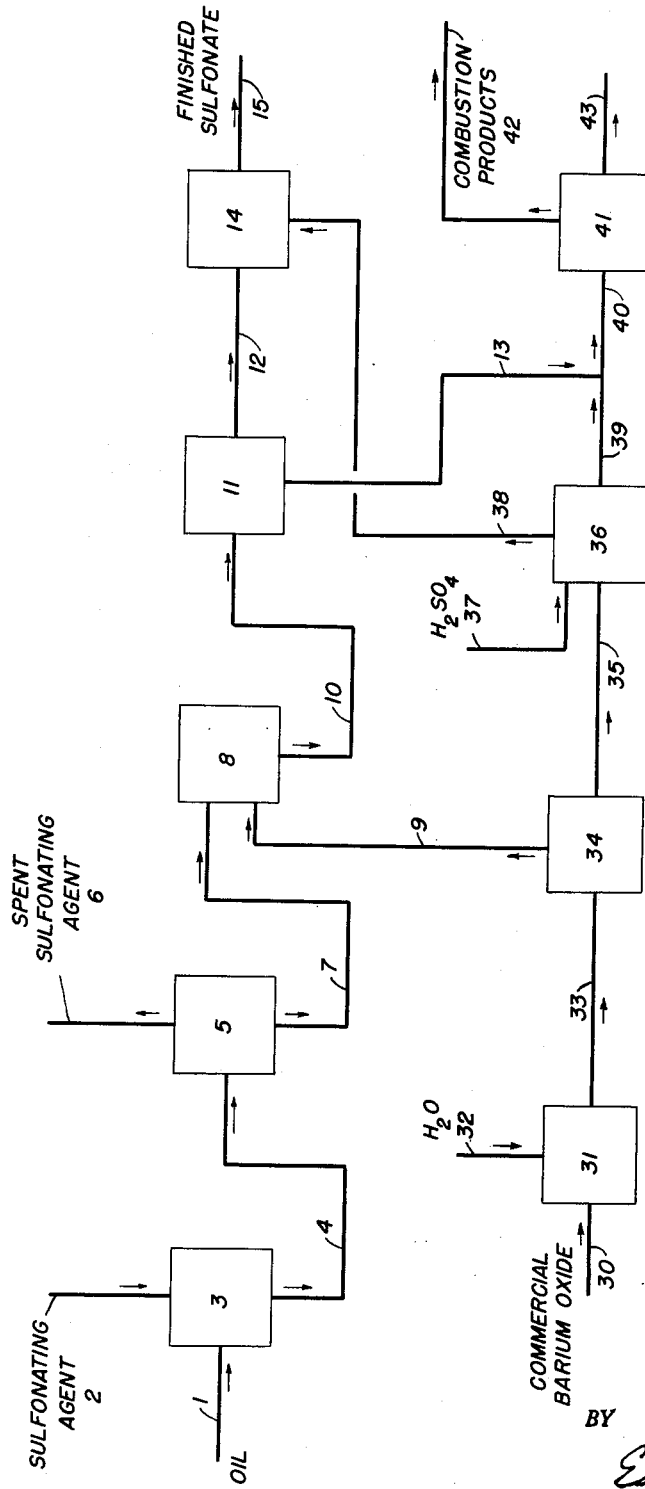
INVENTORS
EDMUND D. BLUM
BY   LEROI E. HUTCHINGS United States Patent Office 3,033,649
Patented May 8, 1962

3,033,649
PROCESS FOR RECOVERING ALKALINE EARTH METAL SULFATES IN MANUFACTURING ALKALINE EARTH METAL SULFONATES
Edmund D. Blum, Elgin, and Le Roi E. Hutchings, Crystal Lake, Ill., assignors to The Pure Oil Company, Chicago, Ill., a corporation of Ohio
Filed June 4, 1959, Ser. No. 818,040
5 Claims. (Cl. 23—122)

This invention relates to a process of manufacturing barium sulfate by the utilization of two previously discarded by-products from the manufacture of barium petroleum sulfonates.

In the manufacture of barium petroleum sulfonates, a sulfonatable oil is contacted with a sulfonating agent under suitable conditions to produce so-called petroleum sulfonic acids. Depending on the conditions of sulfonation, i.e., the temperature and type of sulfonating agent, and to a degree on the type of oil used, the petroleum sulfonic acids so produced comprise various concentrations of "green" or water-soluble petroleum sulfonic acids, and "mahogany" or oil-soluble petroleum sulfonic acids. These acids are recovered by various methods in admixture or separately, with or without some unreacted oil, by processes including sludge-separation, neutralization, washing, extraction, centrifuging and reaction with a neutralizing agent.

Generally, the sulfonation is conducted at temperatures and under conditions to form economical yields of sulfonic acids wherein a sludge phase is formed in the initial reaction. Various solvents and other manipulations are employed to separate the sludge from the acids. This sludge phase contains a large proportion of so-called "green" acids which may or may not be recovered. In other processes sludge separation is prevented, and an oil solution of both types of acids is produced which is neutralized directly and then centrifuged to separate the oil solution from the insolubles that are formed or released during the neutralization. In this latter type of process, the sludge phase contains very little free acid but is rich in metal salts of the green acids, some metal salts of the mahogany acids, unreacted metal compound and unreacted oil. This type of sludge is free of tars, polymers, etc., ordinarily associated with sludge formation due to sulfonation reactions. It constitutes one source reactant for the instant invention as will subsequently be described in more detail.

The neutralization reaction is ordinarily conducted by using aqueous solutions or slurries of metal compounds capable of forming the desired metal sulfonates. For this purpose the acid oil is treated with stoichiometric or excessive amounts of metal compounds as alkali metal and alkaline earth metal carbonates, bicarbonates, acetates, etc. It is generally the practice to use relatively pure metal compounds for the neutralization reaction, since the utility of the metal sulfonate product depends in part on its oil- and water-solubility, its purity and general detergency properties. The presence of contaminants such as metal salts or mixed metal salts, unreacted sulfates, carbonates, etc., may adversely affect the properties and end uses of the finished product.

The metal compounds used are of commercial grade normally and, to avoid impurities in the end-product, must be treated to separate undesired compounds that may be present. In the manufacture of alkaline earth metal petroleum sulfonates, as an example, one practice is to use a commercial grade of alkaline earth metal oxide as the neutralizing agent. These commercial oxides contain substantial amounts of carbonates which are difficult to handle during the neutralization, react incompletely with the sulfonic acids, and should be removed. The crude alkaline earth oxide such as barium oxide is, accordingly, dissolved in water and filtered to remove the insolubles, including the carbonates, which would include barium carbonate. Normally, the resulting filter cake is a by-product which is discarded. This filter cake represents the second source reactant for the instant process.

Metal petroleum sulfonates are widely used in various compositions, including mineral oil compositions. For this purpose, they must be compatible with mineral lubricating oils and any other addends that may be incorporated in such compositions. The sulfonates function as detergents and, depending on the metal ion, are known to be beneficial in many ways. One use is as solubilizers for oxidation products and sludge which form in mineral lubricating oil compositions under extreme conditions, as in the crankcase of an internal combustion engine. In these compositions, the petroleum sulfonates must be compatible with the other addends present in the oil blend. One problem in this connection is the tendency of petroleum sulfonates to cause precipitation and sludge formation in the presence of heavy metal alkyl dithiophosphates, i.e., zinc di-octyl-dithiophosphate. The incompatibility of sulfonates with other addends is in part overcome by blowing the product with air or carbon dioxide in a finishing operation. The integrated process steps of this invention provide a source of carbon dioxide for this treatment and provide means for further reducing the cost of manufacture of sulfonates.

As a result of careful purification of reactants and product streams from sulfonation processes, there are produced various sludges and waste streams which not only present a disposal problem, but are an economic loss. It becomes a primary object of this invention to provide a process wherein at least two such waste streams containing appreciable amounts of alkali or alkaline earth metals may be combined, and unexpectedly cooperate to produce a valuable by-product.

Another object of this invention is to provide a process for the recovery of metal values from by-product sludges separated in petroleum sulfonate manufacture.

Still another object of this invention is to provide a process for preparing alkaline earth metal sulfate from the alkaline earth metal carbonate waste and the sludge waste from processes directed to the preparation of barium petroleum sulfonates.

Still another object of this invention is to provide a process for preparing barium sulfate from the barium carbonate waste and the sludge waste from processes directed to the preparation of barium petroleum sulfonates.

These and other objects will be described or become apparent as the specification thereover is developed.

The invention is best described in relation to the drawing which is a flow diagram illustrating the overall process and the integration of the steps of the invention into the process of sulfonate manufacture.

Referring to the drawing, sulfonatable oil flowing through line 1, and sulfonating agent flowing through line 2, are charged to sulfonation reactor 3. The reaction effluent from reactor 3 is passed through line 4 to separator 5 wherein spent sulfonating agent is removed at line 6 from the sulfonic acids-oil mixture drawn off at line 7.

The acid-oil mixture in line 7 passes to neutralizer 8 wherein it mixes with purified metal oxide or hydroxide, in the form of a melt, slurry or aqueous solution entering through line 9. In reactor-neutralizer 8, the metal compound (neutralizing agent) reacts with the sulfonic acids and the resulting sulfonate-salts reaction product is withdrawn through line 10 to separator 11. Finished metal sulfonates in oil solution are withdrawn through line 12 to storage, or to special finishing and treating steps. One such finishing step is illustrated by treater 14 wherein the sulfonates are treated or blown with carbon dioxide. Part of the carbon dioxide for this purpose in produced in accordance with a subsequent step of this invention. Finished sulfonate product is removed at line 15. Sludge consisting primarily of oil-metal sulfonate complexes is withdrawn from separator 11 at line 13 and is passed to the process of this invention.

In the preparation of metal oxide or metal hydroxide neutralizing agents for use in reactor 8, commercial grade materials are used which contain significant amounts of impurities such as metal carbonates. The commercial neutralizing agents of this type are introduced through line 30 into hydrator or slurry mixer 31 where they are combined with water introduced at line 32. The resulting mixture or slurry of hydrated neutralizing agent (in the case of metal oxides or hydroxides), along with its carbonate and other impurities, is passed through line 33 to filter 34 wherein the solid carbonate and other impurities are removed through line 35. The purified hydrated metal oxide or hydroxide, in the form of a slurry or aqueous solution, is passed from filter 34 via line 9 to neutralizer 8.

In accordance with this invention, the solid carbonate impurities from filter 34 are passed through line 35 to converter 36 wherein this solid filter cake material is reacted with aqueous mineral acid entering through line 37 to form primarily the mineral acid salt of the metal content thereof. Carbon dioxide evolved during this reaction is sent via line 38 to treater 14 to be used as the whole or part of the carbon dioxide for this finishing treatment of the sulfonates.

The reaction mixture from converter 36, comprising essentially the mineral acid salts of the water-insoluble metal impurities obtained in filter 34, is passed through line 39 and mixed with sludge flowing through line 13. The resulting mixture is transferred through line 40 to kiln 41 wherein the mixture is dried and finally roasted to burn off the oleaginous portion of the sludge. The resulting product (now in the form of a relatively pure metal salt of the mineral acid used in recovery), after removal of volatiles including water, combustion products, excess mineral acid in line 42 is drawn off at line 43.

The oil entering line 1 may be previously dried by treatment with alumina, an adsorbent clay, or rock salt to remove traces of water. Reactor 3 may be any suitable type of reactor, preferably constructed of carbon steel and equipped with efficient stirrers to insure efficient reaction. The sulfonating agent may be sulfur trioxide, concentrated sulfuric acid, fuming sulfuric acid, and the like. The sulfonatable oil may include oleaginous substances, hydrocarbons, petroleum fractions, aromatic fractions, unsaturated hydrocarbons, solvent extracts from lubricating oil manufacture, unsaturated fatty oils, fatty acids, and their esters, unsaturated ring compounds, and the like.

The conditions of the sulfonation reaction, various manipulations to insure complete sulfonation, and the steps used during neutralization, and finishing are known in the art. The details of various phases of these steps may be found in United States Patents: Hennig et al., 2,802,026; Hutchings et al., 2,815,370; Marisic et al., 2,828,331; Hutchings, 2,834,802; Crosby et al., 2,834,803, 2,800,503, 2,846,466; and others. Hennig et al., 2,802,026, describes an integrated process employing steps which may be applied to the sulfonate preparation phase, the sludges from which can be utilized in accordance with this invention. Accordingly, it is not necessary to describe the sulfonate-producing part of the process in detail except to state that the reaction of oleaginous sulfonatable material and sulfonating agent takes place at temperatures varying from −30° F. to 150° F., with or without various solvents such as sulfur dioxide, ethylene dichloride, etc., being present. The neutralization reaction is normally carried out employing at least a stoichiometric amount of neutralizing agent, and preferably an excess of same, the excess ranging from 10% to 300% by wt. The settling step is generally conducted at ambient temperatures to as high as the reaction temperature, and centrifuging is conducted under conditions best suited to separate the metal sulfonate product. The finishing reactions such as carbon dioxide treatment are carried out at 100–300° F., during which operation any solvent, such as hexane that was used to precipitate sludge, is also removed, recovered, and recycled.

The present invention is best illustrated by using a petroleum lubricating oil fraction as the sulfonatable material and sulfur trioxide as the sulfonating agent, and applying the techniques illustrated in the aforementioned United States patents on this subject matter. The acid-oil so produced is treated in reactor 8 with a slurry or melt of barium hydroxide for the formation of the barium petroleum sulfonates, which products after treatment with carbon dioxide are removed at line 15.

In conducting this reaction, a commercial grade of barium oxide containing significant amounts of barium carbonate is used as the neutralizing agent in line 30. Barium oxide of this type will contain normally about 3 to 10% of barium carbonate, and minor amounts of other metal salts including metal carbonates. This impure treating agent is mixed with water in slurry mixer or hydrator 31 in such proportions as to produce a liquid melt. To accomplish this, the water and crude barium oxide are mixed under conditions to convert the barium oxide to the hydrate or hydroxide form with only sufficient water present to complete this reaction and form a liquid product. This is accomplished by treating the mixture to agitation and heating to a temperature of about 150° to 300° F. The melt of barium hydroxide will be found to remain stabilized in liquid form at a temperature of about 180° F. and is thus transferred to filter 34. Filtration takes place at the same temperatures, that is about 150° to 300° F., and preferably about 180° F., to separate in line 9 the melt, or slurry, or reactive barium hydroxide or barium hydrate. Preferably, the barium is in the form of barium hydroxide octahydrate. Accordingly, only sufficient amount of water is used to form the octahydrate from the barium oxide. Details of this stage of the process are described in Patent 2,802,026, supra.

As a result of this filtration, a filter cake of solid barium carbonate and other metal carbonates is produced which is transferred to converter 36 and treated with sulfuric acid from line 37. For this process, ordinary concentrated sulfuric acid having a concentration of 96% or above may be used. Other sources of sulfuric acid for this purpose include sulfuric acid containing acid-oil mixtures from preparing white oils, as an example. The reaction taking place in converter 36 is carried out at about 50° F. to 120° F. and the resultant carbon dioxide is used in the finishing of the barium sulfonate in reactor 14. The resulting barium sulfate, along with sulfate salts of other metals present, is transferred by line 39 to meet the sludge coming from the sulfate process in line 13. The mixture is agitated by pumping through line 40 and is conveyed to kiln 41 wherein heat is gradually applied to drive off the water; and finally, the reaction mixture is heated to a temperature of about 400° to 1000° F. under atmospheric pressure. As a result of this reaction, a dehydrated, substantially pure cake of barium sulfate is produced. The other products from this reaction, including water, sulfuric acid, carbon dioxide, etc., are removed at line 42.

One feature of this reaction is that ordinarily it would not be expected that the barium carbonate cake from filter 34 would react completely with the sulfuric acid in converter 36 to give barium sulfate because the product, barium sulfate, is insoluble in sulfuric acid. In this type of reaction one would expect the barium sulfate formed to coat the barium carbonate and prevent the reaction. The sludge added at line 13 serves the purpose of adding to the end-product the recoverable barium sulfate that is present, and the hydrocarbons therein aid in the vaporization of water from the reaction mixture. The sludge contains very little free sulfuric acid but appreciable amounts of barium oxide and some barium carbonate, which latter materials are recovered in the process in the form of barium sulfate or blanc fixe.

In an illustrative example, it was demonstrated that by treating the water-insoluble portion of a commercial grade of barium oxide with boiling 5% sulfuric acid for about 35 minutes, about 92% of the carbonate was converted to sulfate. Before treatment, the material contained 86.5 wt. percent barium carbonate and after treatment it contained only 7.0 weight percent barium carbonate.

In another example the filter cake obtained from the purification of commercial barium oxide, comprising a mixture of barium, calcium and magnesium carbonates, and other insolubles is treated with an excess of 96% sulfuric acid at about 100° F. for four hours. This processing results in a semi-fluid reaction mass which is mixed with about 1 part of sludge from the $SO_3$-sulfonation of a 170 SUS neutral oil and the mixture is heated to 215° F. for 2 hours. Following this, the mixture is raised to a temperature of about 800° F. for 1½ hours. The resulting solid mass comprises barium sulfate (blanc fixe) of commercial purity. The hydrocarbon content of the sludge aids in the drying and calcination of the mixture. Also, recoverable barium and sulfate values in the sludge are transformed to barium sulfate during the calcination. Suitable mineral lubricating oils for use in the process include neutral oils having viscosities at 210° F. of about 170 SUS to 600 SUS, with the viscosity indices varying from about 80 to 100.

What is claimed is:

1. The process of producing alkaline earth metal sulfates which comprises reacting impure alkaline earth metal carbonates recovered from commercial grades of alkaline earth metal oxides with concentrated sulfuric acid to form a product predominating in alkaline earth metal sulfates, treating the resulting product to calcining in the presence of sludge obtained during the sulfonation of a sulfonatable petroleum oil with a sulfonating agent, said sludge containing alkaline earth metal salts of sulfuric acid and alkaline earth metal salts of green and mahogany petroleum acids, unreacted alkaline earth metal compounds and unreacted oil, conducting said calcination at a temperature above about 500° F. to thereby decompose the unreacted oil, dehydrate said mixture, and form a residue comprising alkaline earth metal sulfates and recovering said residue.

2. The process in accordance with claim 1 in which the alkaline earth metal sulfate is barium sulfate.

3. The process in accordance with claim 1 in which at least a stoichiometric amount of sulfuric acid having a concentration of at least about 95% is used and the sulfate mixture formed is mixed with about equal parts of said sludge during said calcination.

4. In the process of producing barium petroleum sulfonates wherein a petroleum oil is treated with a sulfonating agent under conditions to produce petroleum sulfonic acids, said sulfonic acids are neutralized with barium hydroxide to form barium petroleum sulfonate and a sludge phase is separated from said neutralization, the improvement comprising removing the carbonate impurities from said barium hydroxide prior to said neutralization, reacting said carbonate impurities with concentrated sulfuric acid to produce barium sulfate and carbon dioxide therefrom, reacting said barium petroleum sulfonate with said carbon dioxide in a finishing treatment, mixing said barium sulfate and said sludge phase, calcining the mixture at a temperature of at least about 500° F. and recovering barium sulfate from the calcined mixture.

5. The process in accordance with claim 4 in which said barium hydroxide is in the form of a melt with a sufficient amount of water to form barium hydroxide octahydrate thereof, said sludge phase therefrom contains recoverable amounts of barium sulfate and barium carbonate, and said calcining step is conducted at a temperature above 500° F. sufficient to decompose the organic portions of said sludge, vaporize the water present, and form barium sulfate.

References Cited in the file of this patent

UNITED STATES PATENTS

| | | |
|---|---|---|
| 713,800 | Reisert | Nov. 18, 1902 |
| 1,216,338 | McKee | Feb. 20, 1917 |
| 2,285,242 | Weber et al. | June 2, 1942 |
| 2,802,026 | Hennig et al. | Aug. 6, 1957 |
| 2,846,466 | Crosby et al. | Aug. 5, 1958 |